(12) United States Patent
Raghavan et al.

(10) Patent No.: US 8,430,430 B2
(45) Date of Patent: Apr. 30, 2013

(54) HIGH FATIGUE LIFE FITTINGS FOR HIGH-PRESSURE FLUID SYSTEMS

(75) Inventors: Chidambaram Raghavan, Kent, WA (US); Mohamed A. Hashish, Bellevue, WA (US); Olivier L. Tremoulet, Jr., Edmonds, WA (US); Shawn M. Callahan, Seattle, WA (US); Bruce M. Schuman, Kent, WA (US)

(73) Assignee: Flow International Corporation, Kent, WA (US)

( * ) Notice: Subject to any disclaimer, the term of this patent is extended or adjusted under 35 U.S.C. 154(b) by 43 days.

(21) Appl. No.: 12/785,148

(22) Filed: May 21, 2010

(65) Prior Publication Data
US 2010/0224270 A1    Sep. 9, 2010

Related U.S. Application Data

(63) Continuation of application No. 10/922,030, filed on Aug. 19, 2004, now Pat. No. 7,748,750.

(51) Int. Cl.
*F16L 39/00* (2006.01)
(52) U.S. Cl.
USPC ........................................ 285/124.5; 285/19
(58) Field of Classification Search ............... 285/28, 285/124.5, 19, 356, 270, 34, 35
See application file for complete search history.

(56) References Cited

U.S. PATENT DOCUMENTS

| | | | |
|---|---|---|---|
| 753,871 A | | 3/1904 | Fuller |
| 1,062,927 A | * | 5/1913 | Roberts ........................ 285/28 |
| 1,974,402 A | | 9/1934 | Templeton |
| 3,697,119 A | * | 10/1972 | Van Wierst et al. ............. 295/49 |
| 3,739,804 A | | 6/1973 | Dubreuil |
| 3,952,760 A | | 4/1976 | Caldwell |

(Continued)

FOREIGN PATENT DOCUMENTS

| DE | 19859188 A1 | 6/2000 |
|---|---|---|
| DE | 202004005911 U1 | 7/2004 |

(Continued)

OTHER PUBLICATIONS

"Fitting, Tubing & Nipples," Autoclave Engineers, retrieved from http://www.snap-tite.com/AE_Fluid_Components/index.html, downloaded on Aug. 19, 2004, 13 pages.

*Primary Examiner* — Aaron Dunwoody
(74) *Attorney, Agent, or Firm* — Seed IP Law Group PLLC

(57) ABSTRACT

A fitting for collecting or distributing high-pressure fluid via fluid transmission lines is provided. The fitting includes a body, and a plurality of apertures formed in the body in a common plane, intersecting inside the body such that all of the apertures are in mutual fluid communication. Each of the apertures is configured to receive a threaded coupling member of a respective high-pressure transmission line. The fitting also includes first and second compression members positioned on opposing sides of the body and coupled thereto so as to exert a compressing bias to the body in an axis perpendicular to the common plane. The compression members each comprise a raised contact surface corresponding to the region of the body where the plurality of apertures meet, and through which the compressing bias is exerted. The fitting may be an elbow-fitting, a tee fitting, a cross-fitting, or some other configuration.

12 Claims, 8 Drawing Sheets

U.S. PATENT DOCUMENTS

| | | |
|---|---|---|
| 3,986,523 A | 10/1976 | Pacht |
| 4,045,059 A | 8/1977 | Smith |
| 4,306,587 A | 12/1981 | Tchebinyayeff |
| 4,535,938 A | 8/1985 | Lindabury, Sr. |
| 4,690,325 A | 9/1987 | Pacht |
| 5,876,111 A * | 3/1999 | Wu .......................... 362/249.16 |
| 6,092,370 A | 7/2000 | Tremoulet, Jr. et al. |
| 6,161,875 A | 12/2000 | Yamaji et al. |
| 6,892,763 B2 | 5/2005 | Burkhardt et al. |
| 2004/0158419 A1 | 8/2004 | Pearson et al. |
| 2005/0074350 A1 | 4/2005 | Raghavan et al. |

FOREIGN PATENT DOCUMENTS

| | | |
|---|---|---|
| GB | 829182 | 3/1960 |
| GB | 939412 | 10/1963 |
| JP | 10-323403 | 12/1998 |
| TW | 164677 | 7/1991 |
| TW | 381204 | 2/2000 |
| TW | 436583 | 5/2001 |

* cited by examiner

US 8,430,430 B2

HIGH FATIGUE LIFE FITTINGS FOR HIGH-PRESSURE FLUID SYSTEMS

CROSS-REFERENCE TO RELATED APPLICATION

This application is a continuation of U.S. patent application Ser. No. 10/922,030, filed Aug. 19, 2004, now pending, which application is incorporated herein by reference in its entirety.

BACKGROUND

1. Technical Field

The present invention is directed, in general, to high-pressure fluid systems, and in particular to high-pressure fittings for such systems, such as elbows, tees, and crosses.

2. Description of the Related Art

High-pressure fluid systems are used in many industrial applications. For example, a high-pressure pump may be used to provide a pressurized stream of water for cleaning and surface preparation of a wide variety of objects, such as machine parts and ship hulls. High-pressure fluid systems are also used to provide a pressurized stream of water for waterjet and abrasive waterjet cutting. Another use for such systems is in the operation of isostatic pressurization. In such an application, other fluids or objects are subjected to extremely high isostatic pressure for the purpose of sterilizing food products, forming mechanical parts, hardening machine parts, etc.

Applications of the kinds described above may employ fluid systems operating at fluid pressures in a range of 30,000-100,000 psi. Given the immense pressure in such systems, one of the greatest challenges is the transmission of pressurized fluid from one or more fluid pumps to the tools or devices that employ the high-pressure fluid.

FIG. 1 is a horizontal cross section (see lines 1-1 of FIG. 2) of a typical high-pressure fitting, according to known art. FIG. 2 shows the fitting 102 taken along lines 2-2 of FIG. 1. The fitting 100 includes a body 102 with a plurality of threaded apertures 112, to which high-pressure fluid transmission lines 106 are coupled via collars 103 and glands 104. Conical terminations 107 of the fluid transmission lines 106 are biased against conical coupling seats 105 of the body 102 by the threaded glands 104, and thereby form a fluid seal. Weep holes 111 are configured to vent fluid from the apertures 112 to prevent pressurization of the threaded coupling in the event that a seal between a termination 107 and seat 105 fails. It may be seen that X and Y fluid channels 108, 110 meet and cross in the center of the body 102.

The cross-fitting of FIGS. 1 and 2 may be used to collect or distribute fluid, or both, as required. For example, in a case where a single fluid pump is not capable of providing sufficient pressurized fluid for a given application, a second, and even a third pump may be coupled to the cross-fitting 102 at respective ones of the apertures 112, while the remaining aperture 112 is employed to provide pressurized fluid to the selected application, such as an isostatic press or waterjet cutting system. In another case, a single fluid pump may be used to provide pressurized fluid to a plurality of tools, in which case the pump is coupled to a first aperture 112, while each of the plurality of tools is coupled to a further one of the apertures 112.

While a cross-fitting has been described with reference to FIGS. 1 and 2, it will be understood that a T-fitting and an elbow-fitting each function in a similar manner, with the exception that, in the case of a T-fitting, the fitting will have a first fluid channel such as channel 108 pictured in FIG. 2, that traverses the fitting, and a second fluid channel such as the channel 110 of FIG. 2, but which only penetrates from an aperture far enough to join with the first fluid channel, without traversing the body of the fitting. In the case of an elbow-fitting, of course, first and second fluid channels each terminate at a central region of the fitting, without traversing the fitting. The elbow-fitting, in particular, may have channels intersecting at angles other than 90 degrees, while such variations of angle are less common in tee and cross-fittings.

Due to the tremendous pressures transmitted through such fittings, the fittings must be manufactured using extremely strong materials. Nevertheless, fittings such as that described with reference to FIGS. 1 and 2 are commonly subject to failure. In fact, failures of such fittings are one of the most frequent causes of down time and repair expense in high-pressure fluid systems.

When a high-pressure fluid fitting of the type described with reference to FIGS. 1 and 2 is subjected to extreme fluid pressures, fluid within the X channel 108 exerts internal separation forces on the body 102 of the fitting 100 along vectors that are parallel to a Y-Z plane, while fluid in the Y channel exerts separation forces on the body 102 along vectors that are parallel to an X-Z plane. Thus, the fitting 102 is subject to separation forces on vectors that are parallel to a Z axis in magnitudes that are twice as great as in any other direction. Furthermore, because of the sharp corners in the X and Y channels 108, 110 where they intersect, separation forces are concentrated there, and crack initiation is most common at these corners. FIG. 2 shows cracks 116 forming at the point where fluid channels 108, 110 intersect in the middle of the body 102.

Because of the comparatively greater Z axis separation forces, cracks tend to propagate horizontally, i.e., substantially parallel to an X-Y plane, in the body of the fitting. As a horizontal crack appears, the surface area within the crack is subjected to further separation forces parallel to the Z axis, without significant increase in forces in any other direction. Accordingly, once initiated, a crack very quickly propagates, and may eventually destroy the fitting.

BRIEF SUMMARY

According to an embodiment of the invention, a fitting for collecting or distributing pressurized fluid via fluid transmission lines is provided. The fitting includes a body, a plurality of apertures being formed in the body in a common plane and intersecting inside the body, such that all of the apertures are in mutual fluid communication. Each of the plurality of apertures is configured to receive a threaded coupling member of a respective fluid transmission line. The fitting also includes first and second compression members positioned on opposing sides of the body and coupled thereto so as to exert a compressing bias to the body in an axis perpendicular to the common plane. In some embodiments, the compression members each comprise a raised contact surface corresponding to the region of the body where the plurality of apertures meet, and through which the compressing bias is exerted. The fitting may be an elbow-fitting, a tee fitting, a cross-fitting, or some other fitting configuration.

According to another embodiment of the invention, a fitting is provided, including a first component having a plurality of apertures, each configured to receive a coupling member of a respective fluid transmission line. Each of the apertures penetrates horizontally from an exterior of the first component to a central cavity formed therein. The fitting also includes a second component having a plurality of apertures of a number equal to the number of apertures in the first component. The second component is configured to fit within the central cavity of the first component such that, when the coupling member of a fluid transmission line is coupled to one of the apertures of the first component, a termination of the fluid transmission line is biased against a coupling seat of a respective one of the apertures of the second component. The fitting further includes compressing means for subjecting the second component to a compressing bias on a vertical axis, that is, normal to the horizontal plane in which the apertures are provided in the first component.

According to a further embodiment of the invention, a system is provided, including a fluid pump and a fluid distribution fitting. The fitting includes a plurality of apertures formed in a body in a common plane and biasing means for compressively biasing the body along an axis perpendicular to the common plane. A fluid transmission line is coupled at a first end to an output port of the fluid pump, and at a second end to one of the plurality of apertures. The system also includes a tool coupled to another one of the plurality of apertures of the fitting via an additional fluid transmission line. Additional fluid pumps and tools may be coupled in various combinations to additional ones of the plurality of apertures of the fitting via additional fluid transmission lines.

According to an embodiment of the invention, a compression member is provided for coupling to an off-the-shelf fitting and configured to apply a compressing bias to a region of the fitting where fluid channels intersect.

According to an additional embodiment, a method of operation is provided.

DETAILED DESCRIPTION

In the following description, certain specific details are set forth in order to provide a thorough understanding of various embodiments of the invention. However, one skilled in the art will understand that the invention may be practiced without these details. Furthermore, some details that are unnecessary to the understanding of the principles of the invention, and that are well known in the art, have been omitted, for the purpose of clarity. With reference to the accompanying figures, identical reference numbers identify similar elements or acts.

In describing fluid distribution fittings, according to various embodiments of the invention, the fittings are illustrated and described as being configured to be coupled to fluid transmission lines by couplings of the type described with reference to FIGS. 1 and 2, including conical coupling seats, etc. This type of coupling is shown for convenience, only, and is only one of many acceptable coupling methods. The particular method of coupling a fluid transmission line to a fitting is a matter of choice, and may depend upon many factors, including the size of the lines, the pressure in the system, and the type of fluids being transmitted. Accordingly, any reliable means of coupling a fluid transmission line to a fluid fitting is acceptable, and falls within the scope of the invention.

Figure 3:
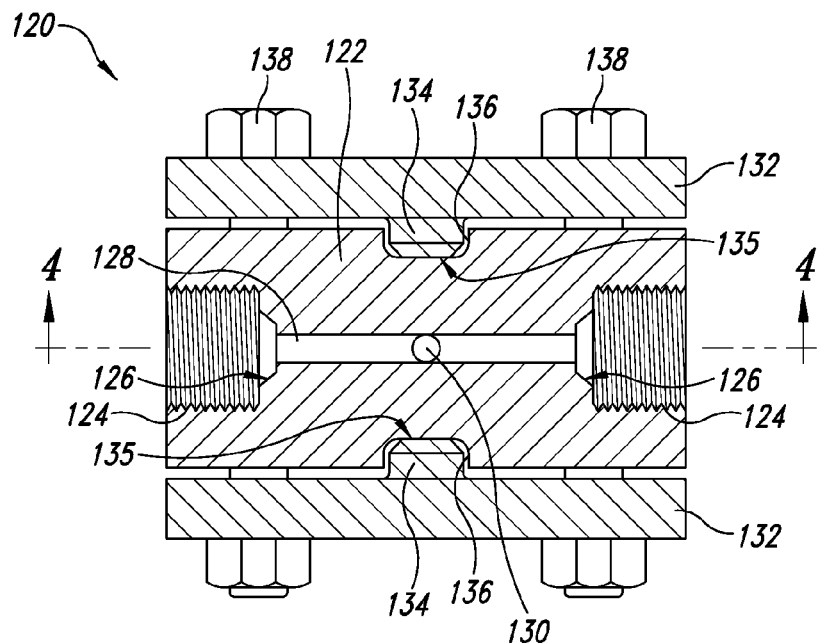
FIGS. 3 and 4 are mutually perpendicular cross sections illustrating a high-pressure fluid fitting according to a first embodiment of the invention.
Figure 4:
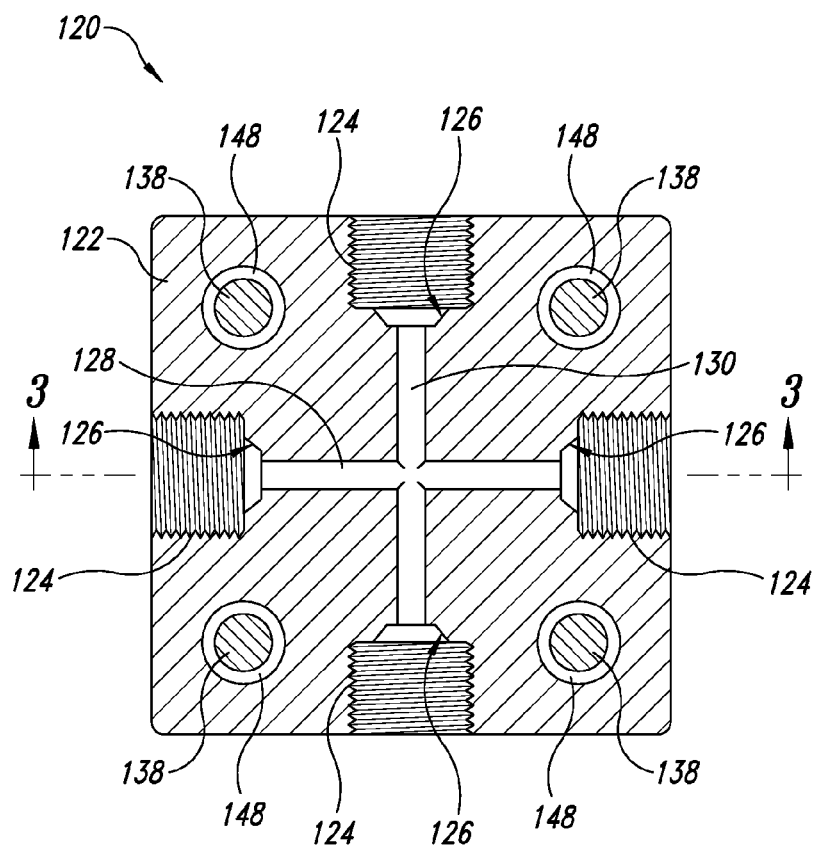

A first embodiment of the invention is described with reference to FIGS. 3 and 4, showing a high-pressure fitting 120. FIG. 3 shows a horizontal cross-section of the fitting 120, taken along lines 3-3, as seen in FIG. 4. FIG. 4 shows a cross-section of fitting 120 taken along lines 4-4 of FIG. 3.

The fitting 120 includes a body 122 having coupling apertures 124 configured to receive coupling members of high-pressure fluid transmission lines. Conical coupling seats 126 are located within each of the coupling apertures 124 and configured to receive the conically shaped terminations of the fluid transmission lines, for sealing thereto. X and Y channels 128, 130 traverse the body 122 at right angles, placing each of the coupling apertures 124 in mutual fluid communication. The body 122 also includes apertures 148 configured to receive coupling fasteners 138 therethrough.

The fitting 120 further includes first and second compression members 132 configured to be fastened to opposite sides of the body 122, as shown in FIG. 3. Fasteners 138 pass through apertures in each of the compression members 132 and the body 122, and are configured to bias the first and second compression members 132 together, with the body 122 positioned therebetween. Each of the compression members 132 further includes a compression prominence 134 provided on each of the respective compression members 132. In one embodiment, the compression prominences 134 are centrally positioned on the compression members 132. Biasing forces exerted on the compression members 132 by the fasteners 138 are transmitted via the compression prominences 134 to a central portion of the body 122, directly above and below the region where the X and Y channels 128, 130 intersect within the body 122.

The body 122 includes blind apertures 136 in positions corresponding to the positions of the compression prominences 134, such that the prominences 134 nest therein. However, the depth of the apertures 136 is less than the height of the prominences 134, such that contact surfaces 135 of the prominences 134 make firm contact with the body 122.

The compression members 132 are configured to exert tremendous compressing forces along a Z axis directly opposite the region of the body 122 where the X and Y channels 128, 130 intersect. These compressing forces resist the separation forces exerted by the fluid within the channels 128, 130 at this point, where the body 122 is most susceptible to crack initiation. Accordingly, initiation of cracks is reduced, and if a crack does still manage to form, propagation is slowed.

The actual amount of force selected to be applied depends, among other factors, upon the material used in the manufacture of the body 122, and may approach the yielding limit of that material. In the case of devices manufactured by the inventors for testing, around 140,000 psi, +/−30,000 psi has been used, but this is not considered to be either an upper or lower limit, with respect to the scope of the invention.

Figure 5:
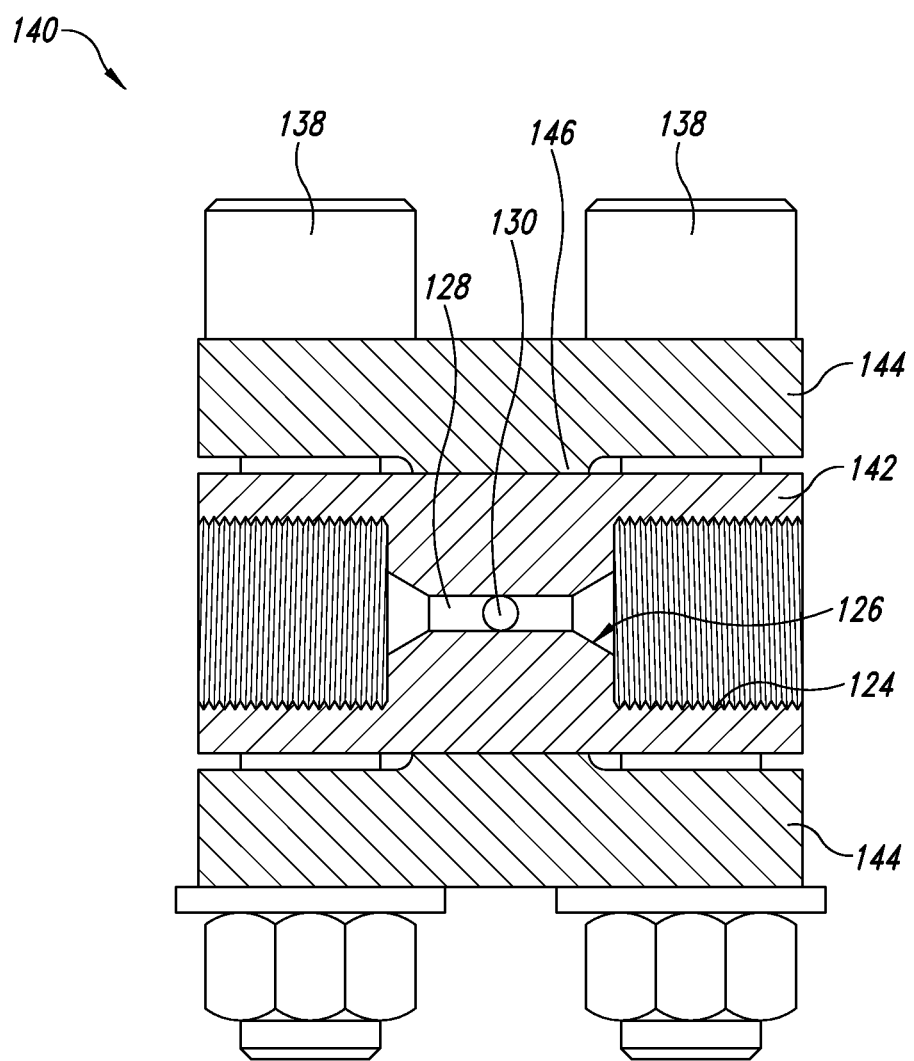
FIG. 5 is a cross section of a high-pressure fluid fitting according to another embodiment of the invention.

FIG. 5 illustrates a second embodiment of the invention, in which a body 142 of fitting 140 has planar upper and lower surfaces. Compression members 144 include compression prominences 146, which are configured to transmit compression forces to the body 142, directly opposite the point where the X and Y channels 128, 130 intersect.

According to another embodiment of the invention (not shown), the compression members are configured to apply an even compression force on the body of the fitting, across the surface of the compression members, and so do not require prominences.

According to another embodiment, also not shown, the prominence may be a separate part interposed between the compression member and the body, or may be formed on the surfaces of the body to interact with the compression members.

Figure 6:
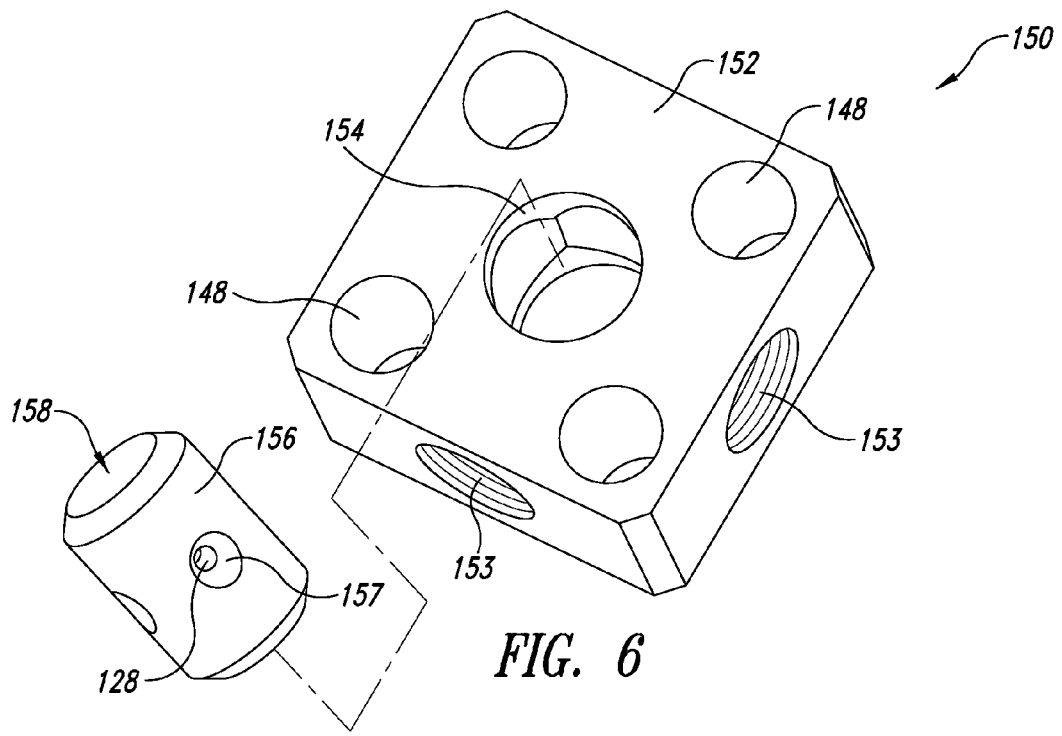
FIG. 6 is an orthographic view of components of a high-pressure fluid fitting according to another embodiment of the invention.
Figure 7:
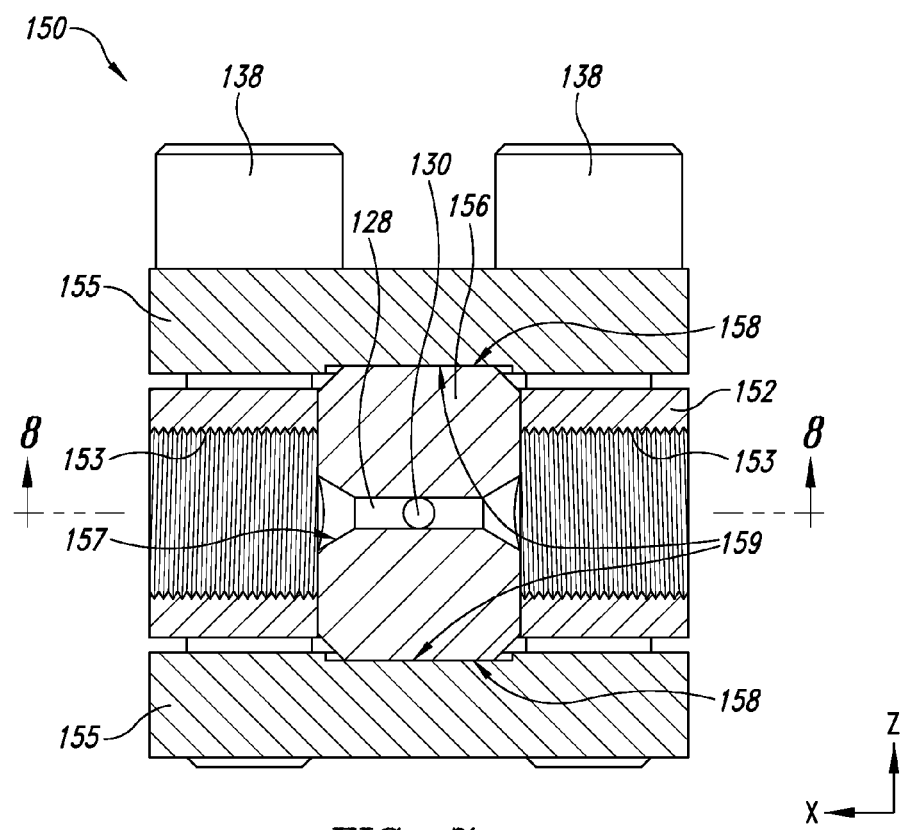
FIG. 7 is a cross section of the high-pressure fluid fitting of FIG. 6.

FIGS. 6-8C show a high-pressure fitting 150 according to another embodiment of the invention. FIG. 6 is an orthographic illustration of a body 152 and insert 156 of the fitting 150, while FIG. 7 shows a cross-section of the fitting 150 taken through the center of the fitting along a vertical plane.

The body 152 includes coupling apertures 153, apertures 148 configured to receive fasteners, and an insert aperture 154. The coupling apertures 153 penetrate the body 152 to intersect with the insert aperture 154.

An insert 156 is configured to fit within the insert aperture 154, with upper and lower surfaces 158 extending slightly beyond upper and lower surfaces of the body 152, as shown in FIG. 7. The insert 156 includes X and Y channels 128, 130, and coupling seats 157.

Compression members 155 are configured to be fastened on opposite sides of the body 152, as described with reference to previous embodiments. Inner surfaces 159 of compression members 155 are configured to make contact with upper and lower surfaces 158 of the insert 156. Fasteners 138 exert a compressing bias on the biasing members 155, which bias is transmitted to the insert 156 along a Z axis via upper and lower surfaces 158.

In operation, coupling members of high-pressure fluid transmission lines are threaded into coupling apertures 153. Conical ends, or terminations, of the fluid transmission lines are biased against the coupling seats 157 of the insert 156 to be sealed thereto. Separation forces due to fluid pressure are limited to the insert 156, while the body 152 is subjected only to biasing forces exerted by the coupling members to effect adequate seals against the coupling seats 157.

Figure 8A:
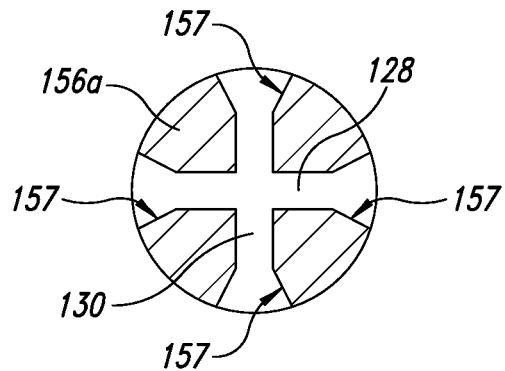
FIGS. 8A-8C are cross sections of a feature of the embodiment of FIGS. 6 and 7, according to various configurations.
Figure 8B:
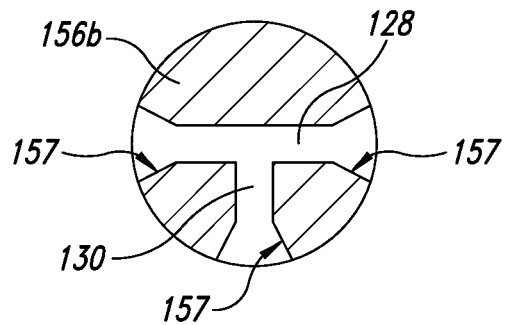
Figure 8C:
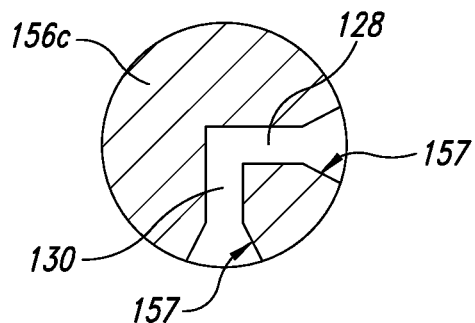

Because the insert 156 includes the coupling seats 157, fluid being transmitted via the fitting 150 does not come in contact with the body 152. According to one embodiment, a single type of body 152, having a cross-fitting configuration, is provided, while a variety of inserts 156a-156c, as shown in FIGS. 8A-8C are provided to accommodate various configuration, including cross, T, and elbow, respectively. According to another embodiment, the body 152 has apertures 153 corresponding in quantity and position to the coupling seats 157 of the respective insert 156.

FIGS. 8A-8C are cross sections of the insert 156, only, according to various alternate embodiments, taken along a plane 8-8, as seen in FIG. 7. The insert 156a of FIG. 8A has a cross-fitting configuration. The X and Y channels 128, 130 each fully traverse the insert 156a, and each includes respective coupling seats 157 at both ends thereof. When the insert 156a is positioned within the body 152, each of the four coupling seats 157 is positioned to receive a conical termination of a fluid transmission line from a respective one of the coupling apertures 153 of the body 152.

Insert 156b of FIG. 8B has a T-fitting configuration. The X channel 128 fully traverses the fitting 156b, and includes coupling seats 157 at both ends thereof. The Y channel 130 only partially traverses the insert 156b, and includes a coupling seat 157 at one end only, terminating at an intersection with X channel 128. When the insert 156b is positioned within the body 152, each of the three coupling seats 157 is positioned to receive a conical termination of a fluid transmission line from a respective one of the coupling apertures 153 of the body 152. It will be recognized that the body 152 will then have one coupling aperture that is unoccupied. However, this is not a significant concern, since fluid in the fitting 150 is contained within the insert 156b.

Insert 156c of FIG. 8C has an elbow-fitting configuration. The X channel 128 traverses the insert 156c only to the center of the insert, and includes a coupling seats 157 at one end, only. Y channel 130 also traverses the fitting 156b only as far as the center, where it intersects with the X channel 128, and includes a coupling seat 157 at one end only. When the fitting 156c is positioned within the body 152, each of the two coupling seats 157 is positioned to receive a conical termination of a fluid transmission line from a respective one of the coupling apertures 153 of the body 152. The body 152 will then have two coupling apertures unoccupied. As with the fitting 156b, this is not a significant concern, since fluid in the fitting 150 is contained within the insert 156c. From the foregoing it may be seen that the same body 152 may be employed as a cross, T, or elbow-fitting, simply by changing the insert 156.

Manufacturing a fitting for high-pressure fluid transmission involves several machining steps, and represents a significant expense, especially considering the fact that failures of fluid fittings are responsible for a high proportion of the repairs required in such systems. According to the embodiments of FIGS. 6-8C, the body 152 of the fitting 150 represents the majority of the machining steps required to form the fitting, while the insert 156 represents a much smaller number of machining steps. Inasmuch as the insert 156 includes the portion of the fitting where the majority of failures occur, a cost savings is realized, since, when a failure occurs, the insert 156 can be replaced without the need to replace the body 152.

In order for a fitting to be most resistant to cracks of the type described above, it has been desirable to manufacture the fitting using a grade of steel having a high yield strength. However, such steel also has a high degree of brittleness, such that there is a danger of catastrophic failure. Accordingly, it has been common to manufacture fittings using steel having a high fracture toughness, which is more malleable, and resistant to catastrophic failure. The tradeoff is that such material is also more subject to crack initiation, and thus will tend to fail more quickly.

Because the insert 156 of the fitting 150 is completely enclosed, it is feasible to use material having a high yield strength in the manufacture thereof, inasmuch as there is no danger that fragments may fly off. Meanwhile, the body 152 and compression members 155 may be manufactured using material having a high fracture toughness, for safety.

Figure 9:
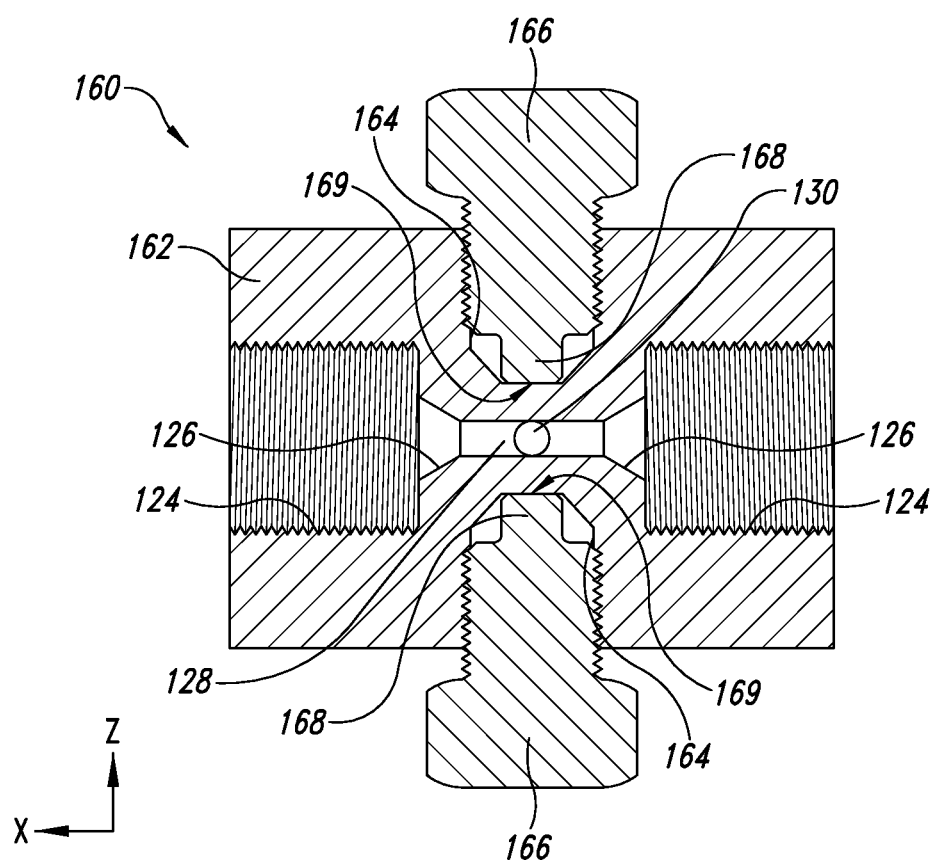
FIG. 9 is a cross section of a high-pressure fluid fitting according to a further embodiment of the invention.

Turning now to FIG. 9, another embodiment of the invention is described therein. High-pressure fitting 160, shown in a vertical cross section, comprises a body 162 and first and second compression members 166.

The body 162 includes coupling apertures 124 and X and Y fluid channels 128, 130, intersecting within the body 162, as described with reference to previous embodiments. The body 162 also includes apertures 164 configured to receive the compression members 166. The compression members 166 are threaded and sized to be received into the apertures 164. The compression members 166 may each include a compression prominence 168.

In operation, the compression members 166 are threaded into apertures 164 until contact surfaces 169 make contact with an inner surface of the aperture 164. Torque is applied to each of the compression members 166 to apply a compressing bias, in the Z axis, to the body 162, directly opposite a region where the X and Y channels 128, 130 intersect.

Figure 10:
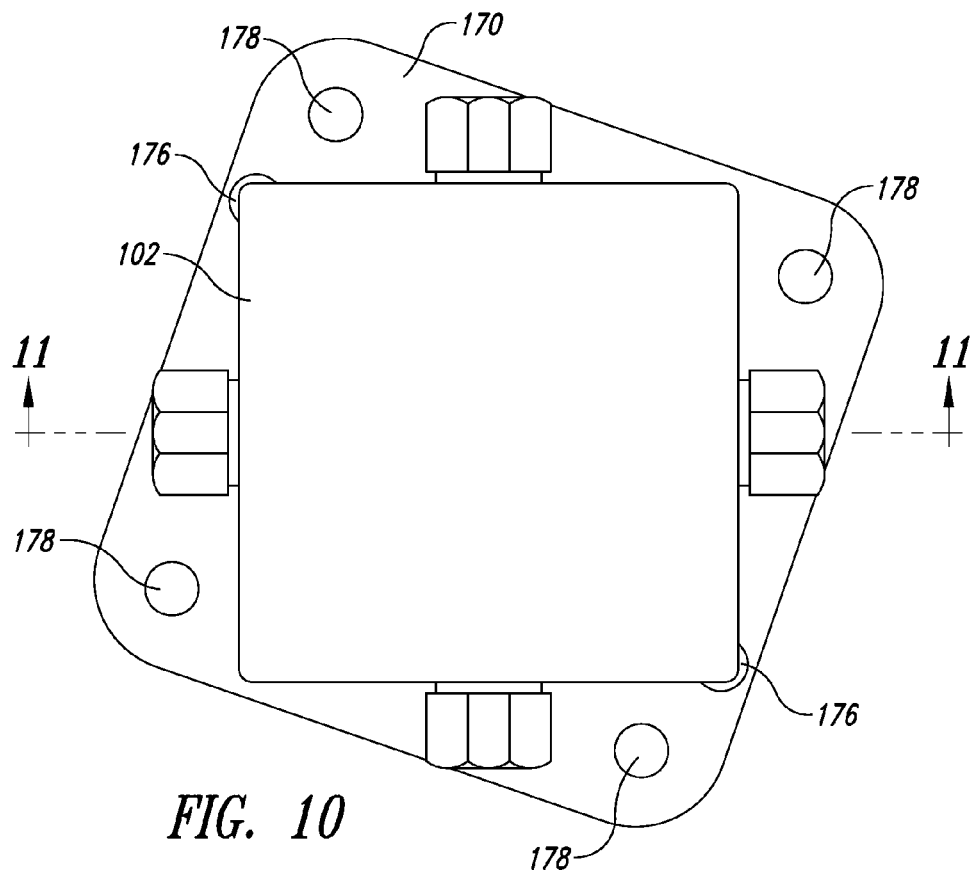
FIG. 10 is a plan view of a compression member according to an embodiment of the invention, in cooperation with a fluid fitting according to known art.
Figure 11:
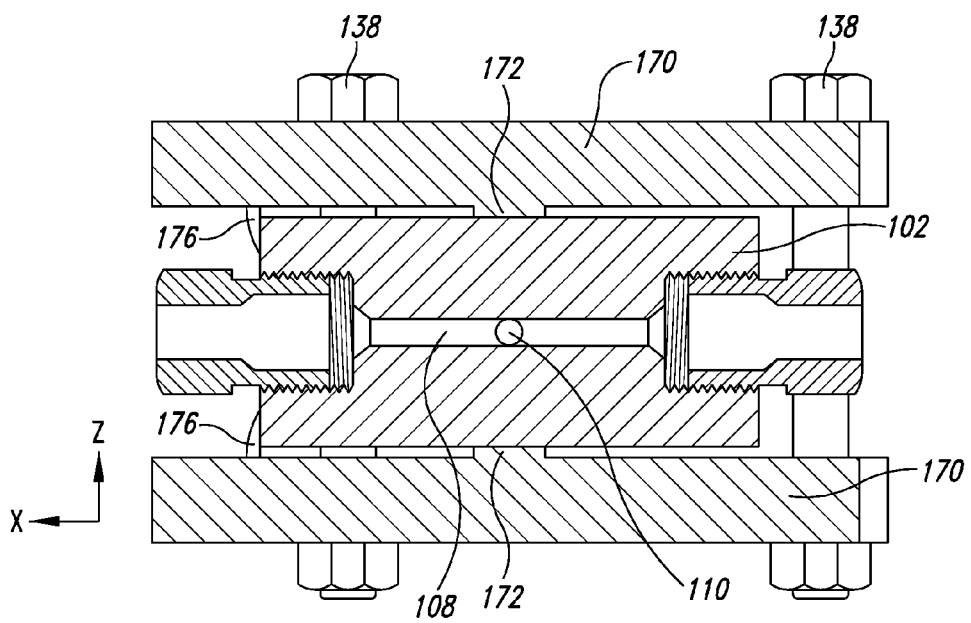
FIG. 11 is a cross sectional view of the assembly of FIG. 10, also including an addition compression member and fasteners.

Another embodiment of the invention will be described with reference to FIGS. 10 and 11. FIG. 10 shows, in plan view, a compression member 170 with a high-pressure fitting 102 positioned thereon. The fitting 102 may be of the type described in the background, with reference to FIGS. 1 and 2. Compression member 170 includes apertures 178 configured to receive fasteners 138, and guide blocks 176 configured to receive the fitting 102 to ensure correct positioning thereof. FIG. 11 is a cross-section of the assembly of FIG. 10 taken along lines 11-11, and further including a second compression member 170 positioned on top of the fitting 102, and fasteners 138, as shown. The compression members 170 each include a compression prominence 172 located such that when the compression members 170 are positioned on opposite sides of the fitting 102, and a selected torque is applied to the fasteners 138, a compressing bias is applied to the fitting 102 directly opposite a region where the X and Y channels 108, 110 intersect within the body of the fitting 102.

Figure 1:
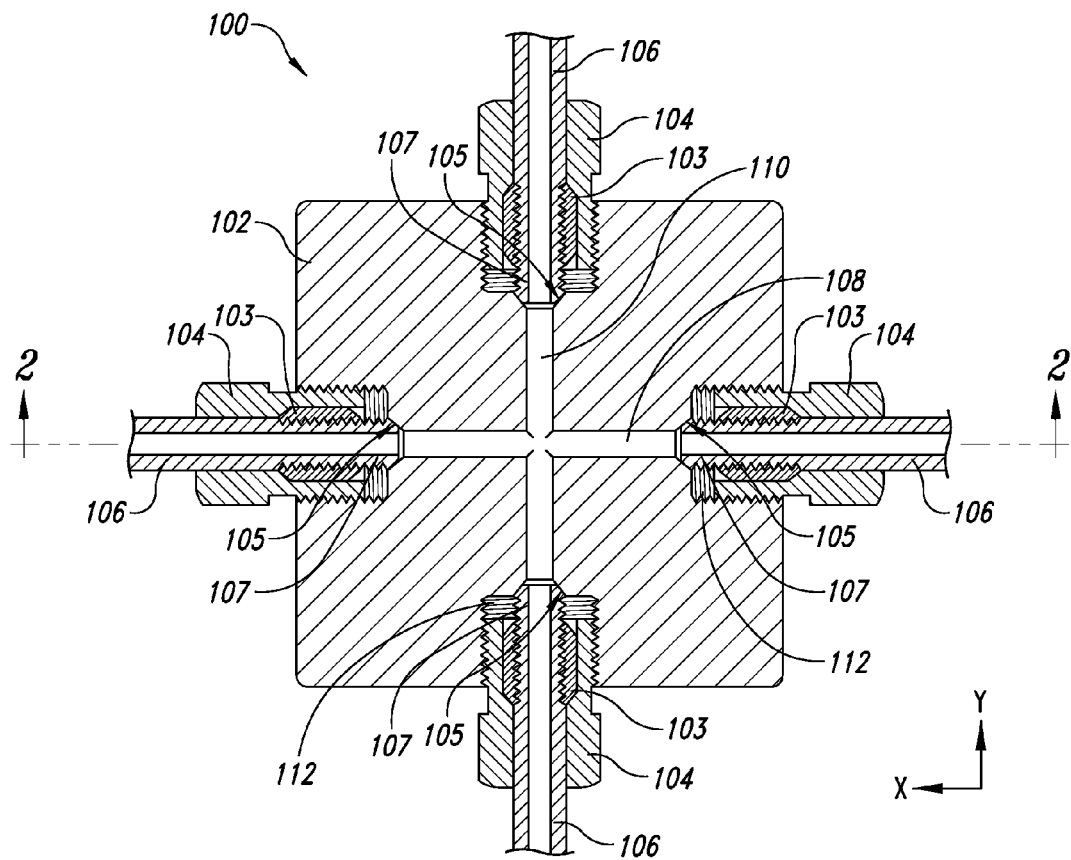
FIG. 1 shows a cross section of a high-pressure fluid fitting according to known art.
Figure 2:
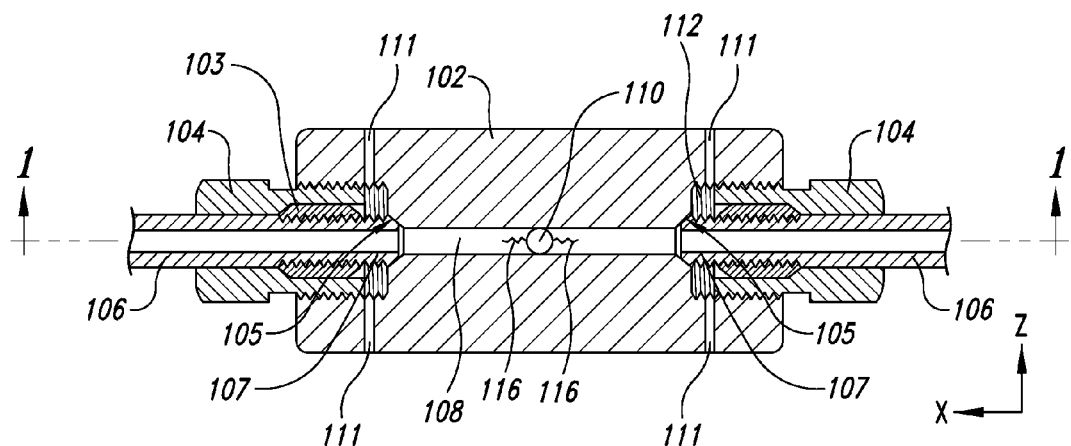
FIG. 2 shows the fitting of FIG. 1 in a section taken at lines 2-2.

According to the embodiment of FIGS. 10 and 11, compression members 170 may be coupled to an off-the-shelf pressure fitting, such as that describe with reference to FIGS. 1 and 2, providing compressing forces to the fitting, for the purpose of reducing initiation and propagation of cracks therein.

Figure 12:
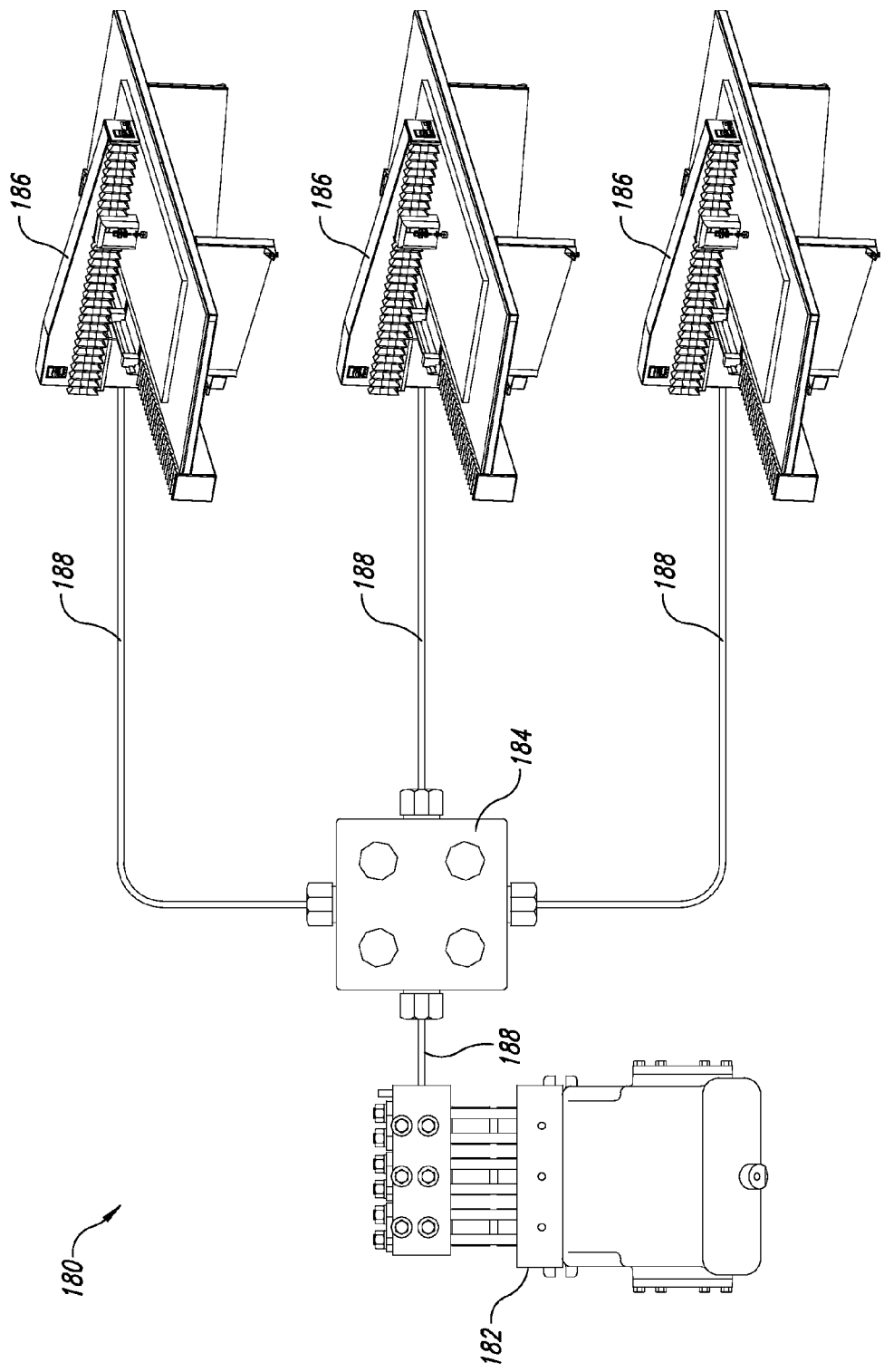
FIG. 12 is a diagrammatical view of a system according to an embodiment of the invention.

FIG. 12 shows a high-pressure-fluid system 180 according to an embodiment of the invention. The system 180 includes a high-pressure fluid pump 182 coupled, via a high-pressure fluid line 188 to a first coupling aperture of a high-pressure fitting 184. First, second, and third waterjet cutting tools 186 are each coupled to a respective one of the remaining coupling apertures of the fitting 184 via additional high-pressure fluid lines 188. While details of the fitting 184 are not shown, it will be understood that the fitting 184 is provided in accordance with one or more of the embodiments of the invention.

The embodiment of FIG. 12 is shown with a single pump and a plurality of tools coupled to a single fitting. It will be recognized that modifications of the embodiment may include multiple pumps coupled to a single fitting to provide increased fluid flow to a high-volume tool. They may also include multiple fittings ganged to function as a manifold for a greater numbers of pumps or tools. One having ordinary skill in the art will recognize many combinations of fittings, tools, and pumps not explicitly described herein. Such combinations also fall within the scope of the invention.

The term "tool" is used herein to refer to any machine or device configured to be driven by, or to utilize, fluid under pressure, and the term "pump" applies to any device or system employed to pressurize or accumulate pressurized fluid. Use of the term "fluid" in the specification or claims, unless otherwise specified, should not be construed narrowly to refer to a particular fluid or class of fluids, but should be read broadly to include all liquid and gaseous fluids.

Commonly available high-pressure fittings, such as the type illustrated in FIGS. 1 and 2, have been subjected to endurance tests by the inventors. The test devices were subjected to repeated pressurizing and depressurizing cycles, at pressures of around 90,000 psi. Under these conditions, the average pressure fitting tested failed after around 75,000 cycles. In comparison, prototype models of at least one of the embodiments of the invention have been tested under similar conditions. The average endurance of the inventive devices tested exceeded 500,000 cycles.

It is well known that, in high-pressure fluid systems of the type described herein, depressurizing, then repressurizing, the system causes significant fatigue on all components in the system. Accordingly, it is customary in such systems to leave much of the system under pressure, even when not in operation. For this reason, the costs associated with frequent replacement of components such as high-pressure fittings goes beyond the actual replacement cost of the components themselves, which is not insignificant. Each time the system is depressurized for the purpose of replacing a component, other components of the system, such as the pumps, valves, seals, other fittings, etc., are subjected to another pressurizing cycle, which reduces their working lifetime. Accordingly, by employing high-pressure fittings of the types described with reference to the various embodiments of the invention, which are demonstrated to have a working life approaching an order of magnitude longer, the working life of other components of the system can also be extended, reducing overall service costs of the system.

The fittings described herein, with reference to the various embodiments disclosed, are shown as cross-fittings, having four apertures and a single X channel and a single Y channel. Other embodiments of the invention include tee-fittings and elbow-fittings, and also fittings having more than four coupling apertures. Such fittings may have multiple X or Y channels, and may have channels lying in other vectors on an X-Y plane.

Embodiments of the invention have been described with reference to high-pressure fluid fittings and systems. This is in part due to the fact that systems operating at extremely high pressures often operate very close to the limits of the yield strength of the materials and structures employed. For example, consider that, in an isostatic press operation, the crystalline structure of a tool steel machined part is modified by the extreme fluid pressures within the press. In fact, such presses may be employed to consolidate powdered metals into solid parts. Clearly, many of the components of a system providing such pressure must also be subject to the same pressure, except that the forces are internal to the components, and may be extremely destructive to the system if not carefully managed.

Nevertheless, the inventors recognize that the forces, in absolute value, generated in extremely high-pressure systems may be met or exceeded in lower-pressure, higher-volume systems. For example, the fluid channels in fittings of the kind described above may have a bore diameter of around 0.062 inches. In contrast, the channel bore of a fitting employed to distribute hydraulic fluid to large hydraulic actuators may exceed two inches. At such a size, the forces generated by a 2,000 psi system can exceed those of a 60,000 psi system utilizing the smaller bore.

Furthermore, engineers and manufacturers strive to reduce mass and size of system components to control material and manufacturing costs and reduce space requirements in shipping, storage, and operation. Thus, it is desirable, in lower pressure systems, to employ fittings that are no more massive than is absolutely necessary. Applying principles of the invention, as described with reference to the disclosed embodiments, to embodiments configured to operate at lower pressures is consistent with these aims, and falls within the scope of the invention.

Terms employed in describing embodiments of the invention are not intended to limit the scope of the invention. For example, use of terms such as upper, lower, above, below, horizontal, vertical, etc., are for convenience in referring to the figures, or to provide a frame of reference for further description, and are not limiting, with respect to the scope of the invention.

Terms used to describe features or components of the embodiments of the invention, in particular those features that have no analogue in known art, have been selected as having commonly accepted definitions that do not conflict with the nature of the feature so described. This is for convenience only. For example, a feature described using the term "compression member" may also be referred to as a truss, a pressurizing component, a support member, etc. A feature described using the term "prominence" may also be referred to as a raised contact, a step, a bump, a knob, etc. Other terms used herein may also be similarly interchanged with other terms that are common in the industry, or terms that are wholly arbitrary. The scope of the invention is not to be limited by the commonly accepted definitions of such terms.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fitting for collecting and distributing pressurized fluid via fluid transmission lines, comprising:
   a distribution body having first and second sides;
   a plurality of distribution channels formed in the distribution body in a common plane and intersecting inside the distribution body;
   a first compression member positioned proximate the first side of the distribution body;
   a second compression member positioned proximate the second side of the distribution body;
   a first compression prominence between the first compression member and the first side of the distribution body, the first compression prominence aligned with a region of the distribution body directly overlying where the distribution channels intersect along an axis perpendicular to the common plane; and
   a biasing feature configured to bias the first and second compression members toward each other, thereby concentrating a compressing bias applied to the distribution body at the region of the distribution body directly overlying where the distribution channels intersect along the axis perpendicular to the common plane.

2. The fitting of claim 1, further comprising:
   a second compression prominence between the second compression member and the second side of the distribution body, the second compression member aligned with a second region of the distribution body directly underlying where the distribution channels intersect along the axis perpendicular to the common plane.

3. The fitting of claim 2 wherein the first compression prominence is made from a unitary body of material with the first compression member and the second compression prominence is made from a unitary body of material with the second compression member.

4. The fitting of claim 1 wherein each of the plurality of distribution channels is configured to receive a threaded coupling member of a respective fluid transmission line.

5. The fitting of claim 1 wherein the at least one biasing feature includes a plurality of fasteners threadedly coupling the first compression member to the second compression member and configured to bias the first and second compression members toward each other.

6. The fitting of claim 1, further comprising:
   a first compression recess formed on the first side of the distribution body, the first compression prominence configured to be partially positioned in the first compression aperture during operation; and
   a second compression recess formed on the second side of the distribution body, the second compression prominence configured to be partially positioned in the second compression aperture during operation.

7. A fitting for collecting and distributing pressurized fluid via fluid transmission lines, the fitting comprising:
   a distribution body having a first side, a second side opposite the first side and a plurality of distribution passages formed in the distribution body in a common plane between the first side and the second side, the plurality of distribution passages intersecting within the distribution body;
   a first compression member positioned proximate the first side of the distribution body, the first compression member including a first compression prominence aligned with a first region of the distribution body on the first side directly overlying where the distribution passages intersect along an axis perpendicular to the common plane;
   a second compression member positioned proximate the second side of the distribution body, the second compression member including a second compression prominence aligned with a second region of the distribution body on the second side directly underlying where the distribution channels intersect along the axis perpendicular to the common plane; and
   a biasing feature configured to bias the first and second compression members toward each other, thereby concentrating a compressing bias applied to the distribution body at the first region and the second region of the distribution body.

8. A system, comprising:
   the fitting of claim 1;
   a fluid pump; and
   a first fluid transmission line having first and second ends, the first end being coupled to an output port of the fluid pump and the second end of the first fluid transmission line being coupled to one of the plurality of distribution channels of the fitting.

9. The system of claim 8, further comprising:
   a first tool; and
   a second fluid transmission line having first and second ends, the first end thereof being coupled to a second one of the plurality of distribution channels and the second end thereof being coupled to a fluid input of the first tool.

10. The system of claim 9, further comprising:

a second tool; and a third fluid transmission line having first and second ends, the first end thereof being coupled to a third one of the plurality of distribution channels and the second end thereof being coupled to a fluid input of the second tool.

11. The system of claim 8, further comprising:

an additional fluid pump; and a second fluid transmission line having first and second ends, the first end thereof being coupled to a second one of the plurality of distribution channels and the second end thereof being coupled to a fluid output port of the additional fluid pump.

12. The system of claim 8, further comprising:

a plurality of additional components chosen from among fluid pumps and tools; and a plurality of additional fluid transmission lines having first and second ends, the first end of each being coupled to a respective one of the plurality of distribution channels and the second end of each being coupled to a fluid port of a respective one of the plurality of components.

* * * * *